US010688920B1

(12) United States Patent
Neubauer

(10) Patent No.: US 10,688,920 B1
(45) Date of Patent: Jun. 23, 2020

(54) SYSTEM AND METHOD FOR CONFIGURING VEHICLE COMPONENTS ACCORDING TO RULES ASSOCIATED WITH A VEHICLE LOCATION

(71) Applicant: Toyota Motor Engineering & Manufacturing North America, Inc., Plano, TX (US)

(72) Inventor: Daniel Thomas Neubauer, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/257,834

(22) Filed: Jan. 25, 2019

(51) Int. Cl.
*G08B 21/00* (2006.01)
*B60Q 1/50* (2006.01)
*G06F 16/29* (2019.01)

(52) U.S. Cl.
CPC ............... *B60Q 1/50* (2013.01); *G06F 16/29* (2019.01); *B60Q 2300/05* (2013.01); *B60Q 2400/20* (2013.01)

(58) Field of Classification Search
CPC .................................. B60Q 1/50; G06F 16/29
USPC ......................................................... 340/468
See application file for complete search history.

(56) References Cited

U.S. PATENT DOCUMENTS

| 7,987,030 B2 | 7/2011 | Flores et al. | |
| 2004/0108970 A1 | 6/2004 | Nealon | |
| 2005/0275562 A1* | 12/2005 | Watanabe | B60Q 1/085 340/933 |
| 2008/0002420 A1* | 1/2008 | Lambert | B60O 1/143 362/543 |
| 2009/0174540 A1* | 7/2009 | Smith | B60O 1/34 340/465 |
| 2012/0032594 A1* | 2/2012 | Hagner | B60O 1/085 315/82 |
| 2013/0076503 A1* | 3/2013 | Ishii | B60K 37/02 340/458 |
| 2013/0154477 A1* | 6/2013 | Wolski | B60O 1/1423 315/82 |
| 2014/0268852 A1 | 9/2014 | Foley et al. | |
| 2015/0043231 A1 | 2/2015 | Clark | |
| 2017/0062691 A1 | 3/2017 | Kirihara et al. | |
| 2019/0213805 A1* | 7/2019 | Prakah-Asante | B60K 35/00 |

\* cited by examiner

*Primary Examiner* — Mark S Rushing
(74) *Attorney, Agent, or Firm* — Christopher G. Darrow; Darrow Mustafa PC

(57) ABSTRACT

A system is provided that allows a driver to customize one or more vehicle components such as lights. The system may allow the user to specify how each light behaves in response to certain conditions or triggers. The customizations may include displaying predetermined or customized shapes and colors, and may include customizing the timing and brightness of the lights. To ensure that the customizations comply with one or more laws, the system may determine the current location of the vehicle. The system may use the location of the vehicle to determine what rules, regulations, and laws apply to the vehicle. The system may then determine if the customizations comply with the determined rules, regulations, and laws. If the customizations comply, the system may allow the vehicle component to operate according to the customizations. If the customizations do not comply, the driver may be alerted and/or the customizations may be adjusted to comply.

20 Claims, 5 Drawing Sheets

SYSTEM AND METHOD FOR CONFIGURING VEHICLE COMPONENTS ACCORDING TO RULES ASSOCIATED WITH A VEHICLE LOCATION

TECHNICAL FIELD

The subject matter described herein relates, in general, to systems and methods for customizing one or more vehicle components such as lights, and, in particular, to determining whether a proposed customization to one or more vehicle components complies with rules and regulations associated with a current location of a vehicle.

BACKGROUND

Vehicles lights, such as taillights, brake lights, interior lights, etc., are made up of arrays of LEDs. The LEDs in each array may be individually addressable and customizable allowing for the adjustment of a variety of light characteristics such as color and brightness. While the technology to customize each LED in a vehicle light exists, currently no car manufacturer provides an application or interface through which a driver or vehicle operator may customize the appearance and operation of their vehicle lights.

One reason that no system for vehicle light customization exists may be due to compliance with regional and national rules that govern the functioning and operation of vehicle lights. These rules may specify the color, size, and timing of vehicle lights. For example, with respect to turn signal lights, the rules may specify permissible colors that may be used by the turn signal lights, the size of the turn signal lights, how long each turn signal light must be on during each cycle, how long each turn signal light must be off during each cycle, etc.

As may be appreciated, if a driver was permitted to customize one or more of their vehicle lights, the driver may inadvertently violate one or more of the regional or national rules that apply to vehicle lights. This problem is exacerbated by the fact that vehicles are inherently mobile and therefore which regional or national rules apply to the vehicle lights may change as the vehicle moves between different states and different countries. Non-compliance with regional or national rules may expose the driver to criminal or civil fines.

SUMMARY

In one embodiment, a system is provided that allows a driver to customize one or more vehicle components such as lights. The system may allow the user to specify how each light behaves in response to certain conditions or triggers. For example, the system may allow the driver to specify how the turn signal lights behave when the user locks the car, unlocks the car, or engages the turn signal. The customizations may include displaying predetermined shapes and colors, and may include customizing the timing and brightness of the lights. To ensure that the customizations comply with one or more state, regional, and national rules, regulations, or laws, the system may determine the current location of the vehicle. The system may use the location of the vehicle to determine what rules, regulations, and laws apply to the vehicle. The vehicle may then determine if the customizations comply with the determined rules, regulations, and laws. If the customizations comply, the system may allow the vehicle component to operate according to the customizations. If the customizations do not comply, the driver may be alerted and/or the customizations may be adjusted to comply.

In one embodiment, a system for customizing one or more components of a vehicle is provided. The system includes one or more processors and a memory communicably coupled to the one or more processors. The memory storing an image module including instructions that when executed by the one or more processors cause the one or more processors to capture an image. The memory further storing a customization module including instructions that when executed by the one or more processors cause the one or more processors to: provide a user interface, the user interface including a plurality of elements, and each element corresponding to a vehicle component of a plurality of vehicle components; receive a selection of at least one element of the plurality of elements through the user interface; and receive a first set of parameters for the operation of the vehicle component corresponding to the selected at least one element generate one or more feature maps for the captured image. The memory further storing a compliance module including instructions that when executed by the one or more processors cause the one or more processors to: determine a location associated with the vehicle; determine a set of rules for the vehicle based on the determined location; determine if the parameters of the first set of parameters comply with the rules of the set of rules; and if it is determined that the parameters of the first set of parameters comply with the rules of the set of rules, configure the vehicle component corresponding to the selected at least one element to operate according to the first set of parameters.

In one embodiment, a method for customizing one or more components of a vehicle is provided. The method includes: determining that a current location associated with a vehicle has changed; in response to the determination that the current location associated with the vehicle has changed, determining a set of rules for the vehicle based on the current location of the vehicle; determining at least one vehicle component of a plurality of vehicle components of the vehicle that is operating according to a first set of parameters; determining if the first set of parameters comply with the determined set of rules; and if it is determined that the first set of parameters comply with the determined set of rules, allowing the at least one vehicle component to operate according to the first set of parameters.

In one embodiment, a non-transitory computer-readable for customizing one or more components of a vehicle is provided. The non-transitory computer-readable medium includes instructions that when executed by one or more processors cause the one or more processors to: provide a user interface, the user interface including a plurality of elements, and each element corresponding to a vehicle component of a plurality of vehicle components; receive a selection of at least one element of the plurality of elements through the user interface; receive a first set of parameters for the operation of the vehicle component corresponding to the selected at least one element; determine a location associated with the vehicle; determine a set of rules for the vehicle based on the determined location; determine if the parameters of the set of parameters comply with the rules of the set of rules; and if it is determined that the parameters of the set of parameters comply with the rules of the set of rules, configure the vehicle component corresponding to the selected at least one element to operate according to the set of parameters.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
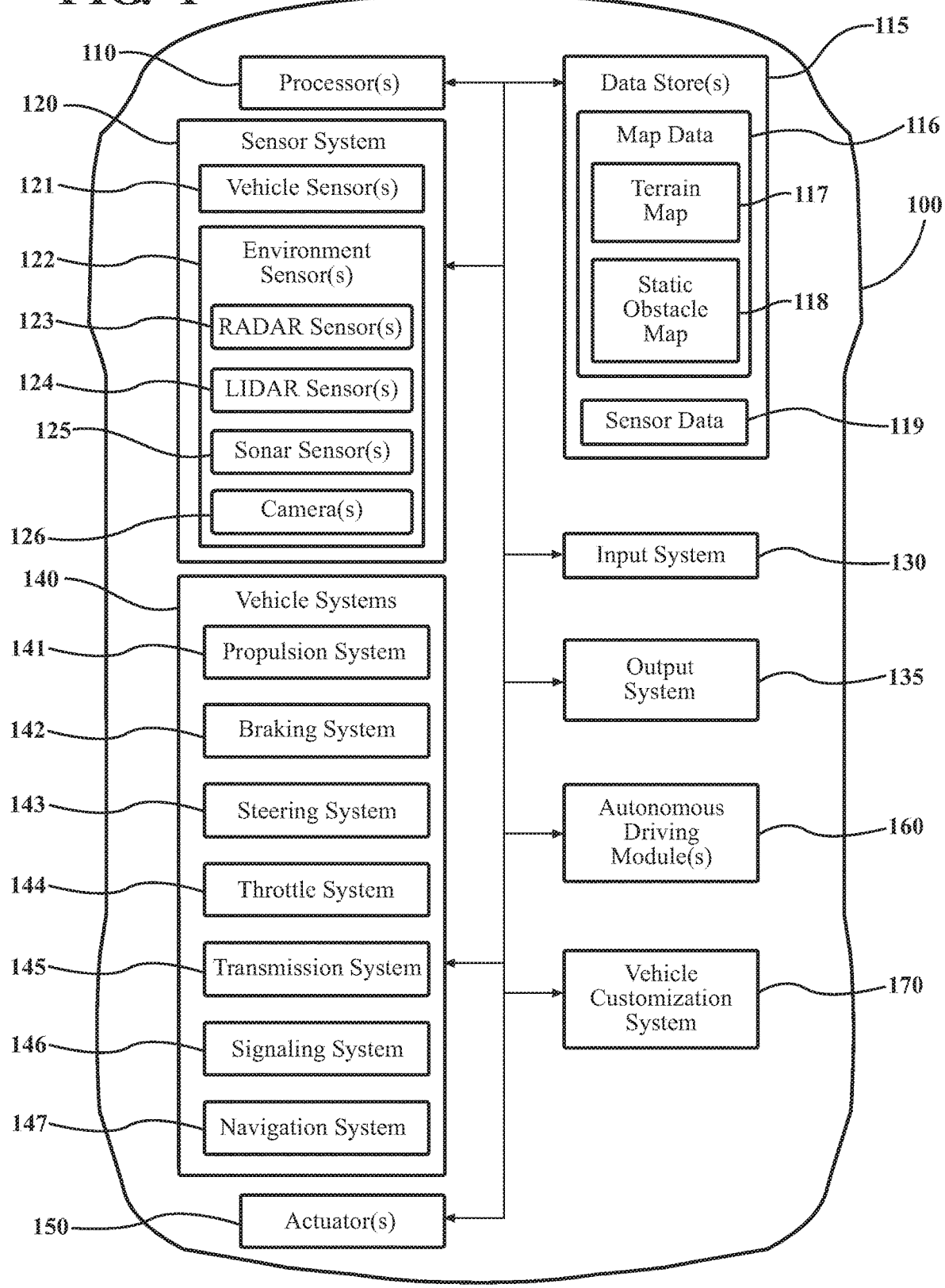
FIG. 1 illustrates one embodiment of a vehicle customization system that is associated with customizing vehicle components and determining if the customization complies with one or more rules.

Systems, methods, and other embodiments associated with customizing one or more vehicle components are disclosed. As described above, vehicles such as the vehicle 100 of FIG. 1 frequently include multiple customizable vehicle components. These customizable vehicle components may include the various lights associated with the vehicle 100 including, but not limited to, headlights, fog lights, driving lights, cornering lights, front and rear side lights, brake lights, taillights, and interior lights. Other types of vehicle components may be customized including suspension (e.g., raise or lower vehicle), windshield wipers (e.g., increase or decrease speed), vehicle horn (e.g., change tone or duration), and windows (e.g., raise or lower windows).

As will be described further below, a driver associated with the vehicle 100 may customize one or more vehicle components by providing what are referred to herein as "parameters" to a vehicle customization system 170. A parameter may control how a particular vehicle component behaves and under what circumstances. For example, a driver may provide parameters for a vehicle component such as a headlight that specify that the headlight flashes the color orange three times for five second whenever the vehicle 100 is unlocked. The driver may provide other parameters that specify that the headlight flashes the color blue four times for three seconds whenever the vehicle 100 is locked. As another example, the driver may provide parameters for the hazard lights to display a particular message when engaged such as "need help" or "stay back."

In order to ensure that the customizations for a vehicle component comply with national, local, or regional laws, the vehicle customization system 170 may determine the current location of the vehicle 100 and may retrieve one or more rules associated with the current location. As used herein the "rules" associated with a location may refer to the various laws and regulations that govern a location and that are directed to vehicle components. These rules may include local, state, and national laws and regulations.

After retrieving the rules associated with the location of the vehicle, the vehicle customization system 170 may determine if the parameters of the customization complies with the rules associated with the location. If the parameters comply with the rules, the vehicle customization system 170 may allow the vehicle component to operate according to the parameters. Else, the vehicle customization system 170 may reject the parameters, or may suggest parameters to the driver of the vehicle 100 that are in compliance with the parameters. Moreover, even after determining that the parameters associated with a vehicle component customization comply with the rules, the vehicle customization system 170 may periodically recheck the parameters of the customized vehicle components against newly retrieved rules. The vehicle customization system 170 may perform the recheck in response to a certain amount of time passing, in response to a notification that some of the rules associated with the location have changed, or in response to a change in location of the vehicle 100 (e.g., a change to the city, state, or country that the vehicle 100 is located in).

The vehicle customization system 170 described herein provides many advantages over the prior art of record. First, by providing a user interface through which a driver can customize the behavior of one or more vehicle components, the overall driving experience of the driver is increased because the driver is able to quickly and easily change the behavior of vehicles components based on their moods and interest. Depending on the embodiment particular seasonal or professionally designed vehicle component customizations could be sold to the driver, which would provide an additional revenue stream to vehicle 100 manufacturers.

Second, by ensuring that any proposed vehicle component customization complies with all rules associated with the location of the vehicle 100, the driver of the vehicle 100 (and manufacturer of the vehicle 100) can be assured that the driver will not apply a customization to one or more vehicle components that could subject the driver to legal fines and/or punishments. Moreover, the customizations are rechecked against updated rules when the location of the vehicle 100 changes (e.g., drives to a new state or country), creating additional protections for the driver of the vehicle 100 against legal fines and/or punishments.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a vehicle customization system 170 that is implemented to perform methods and other functions as disclosed herein relating to customizing vehicle components of the vehicle 100. The noted functions and methods will become more apparent with a further discussion of the figures.

Figure 2:
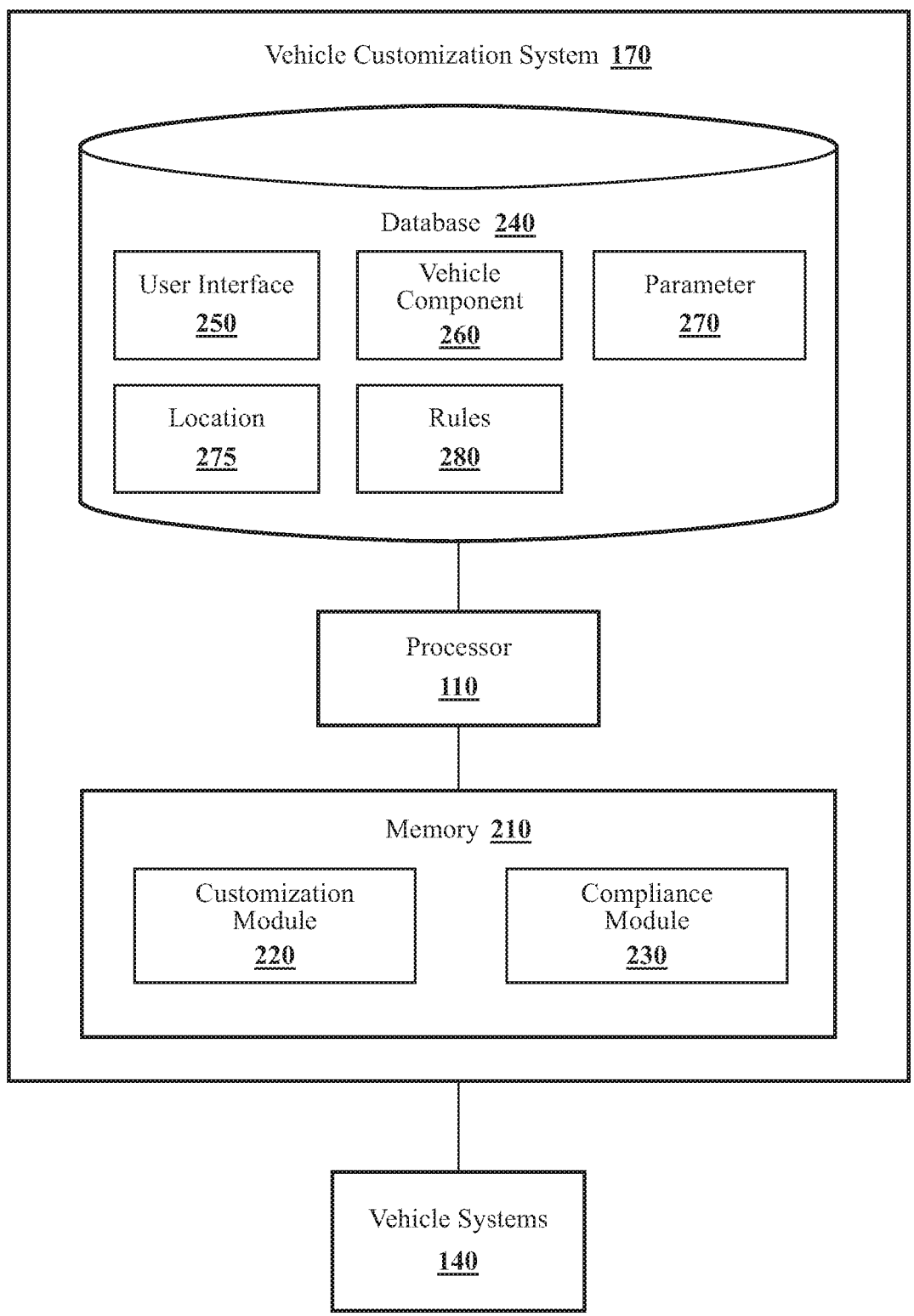
FIG. 2 illustrates one example of a vehicle customization system as embodied herein.

With reference to FIG. 2, one embodiment of the vehicle customization system 170 of FIG. 1 is further illustrated. The vehicle customization system 170 is shown as including a processor 110 from the vehicle 100 of FIG. 1. Accordingly, the processor 110 may be a part of the vehicle customization system 170, the vehicle customization system 170 may include a separate processor from the processor 110 of the vehicle 100 or the vehicle customization system 170 may access the processor 110 through a data bus or another communication path. It should be appreciated, that while the vehicle customization system 170 is illustrated as being a single contained system, in various embodiments, the vehicle customization system 170 is a distributed system that is comprised of components that can be provided as a centralized server, a cloud-based service, and so on. Moreover, the vehicle customization system 170 described herein is not limited to vehicle-based implementations, but may be implemented using any general purpose computing device.

In one embodiment, the vehicle customization system 170 includes a memory 210 that stores a customization module 220 and a compliance module 230. More or fewer modules may be supported. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. Moreover, as previously noted, in various embodiments, one or more aspects of the vehicle customization system 170 are implemented as cloud-based services, and so on. Thus, one or more modules of the vehicle customization system 170 may be located remotely from other components and may be implemented in a distributed manner.

Furthermore, in one embodiment, the vehicle customization system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes a user interface along with, for example, other information that is used and/or generated by the modules 220 and 230 such as one or more vehicle components 260, parameters 270, locations 275, and rules 280. Of course, in further embodiments, the various information may be stored within the memory 210 or another suitable location.

The customization module 220 may provide a user interface 250 through which a driver 100 may customize one or more vehicle components 260. As used herein a "vehicle component" 260 may include any part or aspect of the vehicle 100 that may be customized by a driver and may include, but is not limited to, headlights, taillights, side lights, turn lights, fog lights, interior lights, brake lights (also referred to as "stop lights"), etc. Generally, any light of the vehicle 100 may be considered a vehicle component 260. Note that while the embodiments described in the specification generally relate to vehicle component 260 that are exterior and interior lights, it is for illustrative purposes only. Other vehicle components 260 may be supported such as horns, ignition, windows, rear view mirrors, side view mirrors, suspension, windshield wipers, spoilers, sunroofs, etc.

The customization module 220 may provide the user interface 250 using an application ("app") that the driver may download to their smartphone or computing device. Alternatively or additionally, the customization module 220 may provide the user interface 250 though a web page that the driver may access with their smartphone or computer device. Any type of user interface 250 may be supported.

Figure 5:
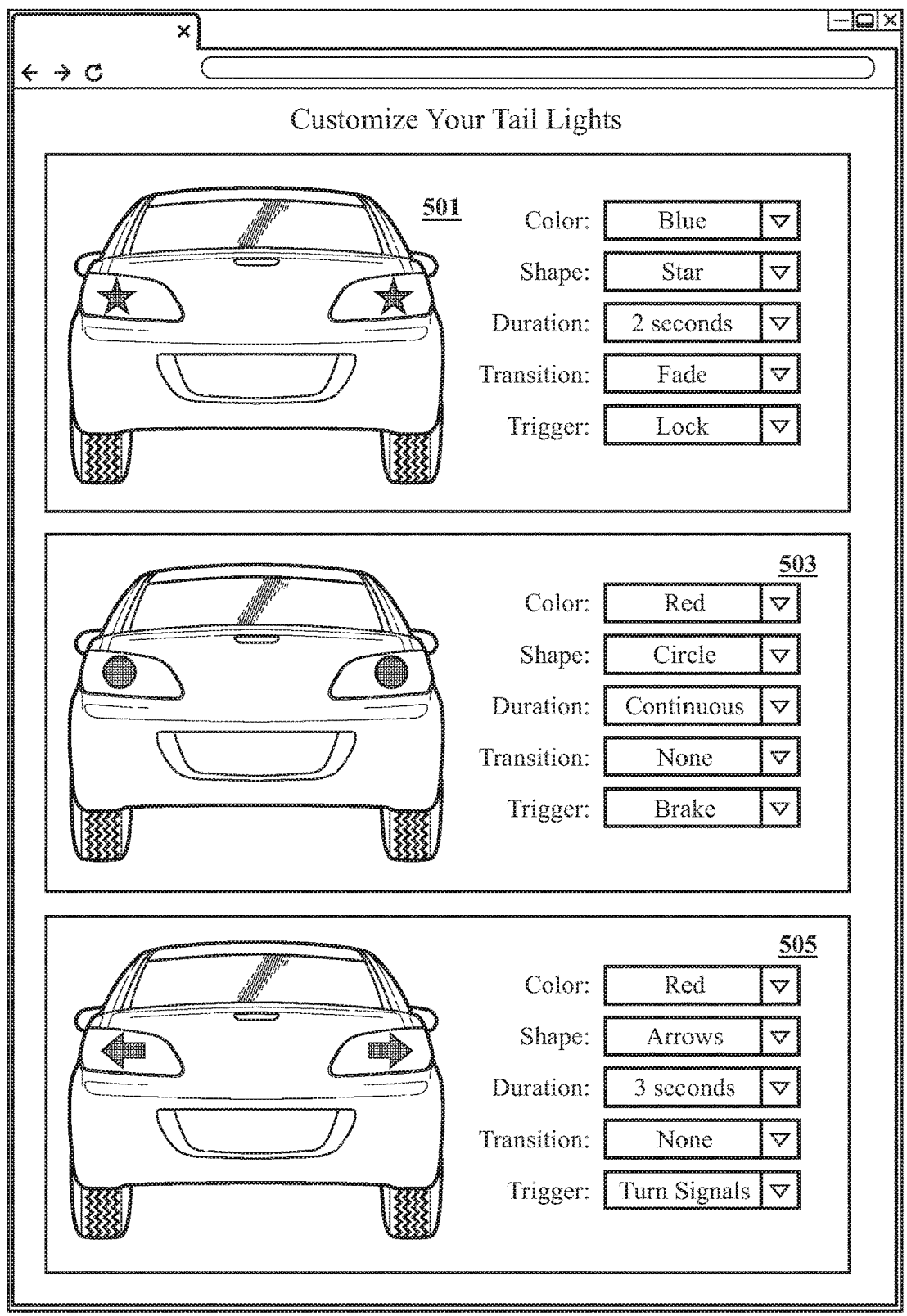
FIG. 5 illustrates an example user interface for customizing one or more vehicle components.

Continuing to FIG. 5, an example illustration of a user interface 500 is shown. The user interface 500 is a web page and the driver or operator of the vehicle 100 has elected to customize a taillight vehicle component 260. For example, the driver may have previously selected a user interface element labeled "Taillights."

Returning to FIG. 2, the driver may use the user interface 250 to customize on or more vehicle components 260 by providing a set of parameters 270. Each parameter 270 may control how a particular vehicle component operates or functions. For example, for a vehicle component such as a brake light, the parameters 270 in the set of parameters may include color, fade, time, intensity, brightness, duration, etc. The parameters 270 may also indicate predefined shapes such as squares, hearts, circles, etc. The parameters 270 may further define certain preprogramed actions or behaviors such as strobe, waterfall, or breathing effects for the lights. There is no limit to the types of parameters 270 that may be supported.

The set of parameters 270 associated with a vehicle component 260 may further include what is referred to as a trigger parameter 270. The trigger parameter 270 may indicate the vehicle 100 action or state that causes the associated vehicle component 260 to operate according to the parameters 270 in the set of parameters 270. The trigger parameters 270 may include locking the vehicle 100, unlocking the vehicle 100, engaging the vehicle 100 brakes, disengaging the vehicle 100 brakes, activating or deactivating the vehicle 100 throttle, opening or closing a vehicle 100 door or trunk, activating or deactivating the vehicle 100 turn signals, horn, or windshield wipers, etc. Other triggers parameters 270 may include the number of passengers that are detected in the vehicle 100, or even the location of the vehicle 100 (e.g., home or not home).

Returning to FIG. 5, shown in the user interface 500 are user interface elements corresponding to different sets of parameters 270 (i.e., the user interface elements 501, 503, and 505). Each set of parameters 270 includes the parameters such as color, shape, duration, transition, and trigger. In the user interface element 501, the driver has selected the values of "Blue", "Star", "2 seconds", "Fade" and "Lock" for the parameters 270 of "Color", "Shape", "Duration", "Transition", and "Trigger". Accordingly, when the driver triggers the corresponding customization by locking the vehicle 100, the taillights will display a blue star shape that fades away after two seconds.

In the user interface element 503, the driver has selected the values of "Red", "Circle", "Continuous", "None" and "Brake" for the parameters 270 of "Color", "Shape", "Duration", "Transition", and "Trigger". Accordingly, when the driver triggers the corresponding customization by engaging the vehicle 100 brakes, the taillights will display a red circle shape that remains until the user disengages the vehicle 100 brakes.

In the user interface element 505, the driver has selected the values of "Red", "Arrows", "3 seconds", "None" and "Turn signal" for the parameters 270 of "Color", "Shape", "Duration", "Transition", and "Trigger". Accordingly, when the driver triggers the corresponding customization by engaging the vehicle 100 turn signal, the taillights will display a red arrow that remains for three seconds.

Returning to FIG. 3, note that a set of parameters 270 may be used to control a single vehicle component 260, or a group of vehicle components 260. For example, the driver may create a set of parameters 270 that cause the headlights of the vehicle 100 to flash in a certain pattern when the driver locks the vehicle 100. In another example, the driver may create a set of parameters 270 that cause the headlights and the taillights to alternatively flash according to a pattern when the driver locks the vehicle and a passenger is detected in the vehicle 100. Other combinations of vehicle components 260 may be supported.

Depending on the implementation, the driver may be able to specify parameters for particular parts or elements of a vehicle component. As described above, vehicle components 260 such as lights may be made up of arrays of LEDs or other addressable elements. Because each LED is separately addressable, the driver may provide a set of parameters 270 to control each individual LED, or groups of LEDs, allowing for a wide variety of possible customizations.

The driver or operator of the vehicle 100 may customize the vehicle components 260 using the user interface 250. In some implementations, the user interface 250 may display a user interface element for some of all of the vehicle components 260 that may be customized. The driver may then select one or more user interface elements that correspond to the desired vehicle components 260 for customization.

Depending on the implementation, after the driver selects the one or more vehicle components 260 for customization, the customization module 220 may display the various parameters 270 that are available for customization for the selected vehicle components 260 in the user interface 250. For example, where the selected vehicle component 260 is a hazard light, the customization module 220 may display available parameters 270, and parameter 270 values, in the user interface 250 such as color, duration, text, intensity, brightness, trigger, etc. The user may then select one or more of the displayed parameters 270 and may provide values for some or all of the selected parameters 270.

Alternatively or additionally, the customization module 220 may display previously generated vehicle component 260 customizations to the driver in the user interface 250. The displayed vehicle component 260 customizations may be customizations that created by designers or other drivers and made available through the user interface 250. For example, a car manufacturer may provide vehicle component 260 customizations for special events or holidays such as Christmas or New Years. For Christmas, the customization may include parameters 270 that cause vehicle components 260 such as the taillights to blink red and green, display shapes such as snowmen and reindeer, or display words such as "Ho, Ho, Ho" or "Happy Holidays" when the vehicle 100 is locked.

Depending on the implementation, drivers (or vehicle manufacturers) may upload or otherwise make available the vehicle component 260 customizations through the user interface 250. The drivers and vehicle manufacturers may make the vehicle component 260 customizations available for free to other drivers, or may make the vehicle component 260 customizations available for a fee or in exchange for viewing an advertisement in the user interface 250. As may be appreciated, the user interface 250 may provide a marketplace for the selling and trading of vehicle component 260 customizations similar to existing marketplaces for smartphone applications.

The customization module 220 may be further configured to cause the one or more vehicle components 260 to operate according to the parameters 270 associated with any of the vehicle component 260 customizations. Depending on the embodiment, the customization module 220 may cause the one or more vehicle components 260 to operate according to the parameters 270 by sending a corresponding instruction to the vehicle systems 140. As will be described further below, the vehicle systems 140 include the various systems that control the operation of the vehicle components 260 such as the signaling system 146, braking system 142, propulsion system 141, etc.

The compliance module 230 may be configured to ensure that any customized vehicle components 260 of the vehicle 100 operate in compliance with all local, state, and national laws and regulations that apply to the current location 275 of the vehicle 100. As described above, the particular local, state, and national laws and regulations that apply to a particular location are referred to as a set of rules 280. For example, a vehicle 100 that is located in Los Angeles is governed by a set of rules 280 that include the laws and regulations of Los Angeles applicable to vehicles 100 (if any), the laws and regulations of California applicable to vehicles 100, and the laws and regulations of the United States of America applicable to vehicles 100. If the vehicle 100 were to travel from Los Angeles to Las Vegas, the vehicle 100 would be governed by a different set of rules 280 based on the rules and regulations of Las Vegas (if any), Nevada, and the United States of America.

Depending on the embodiment, the compliance module 230 may store rules 280 for various locations in the database 240 or memory 210 associated with the vehicle customization system 170. Alternatively, the compliance module 230 may request the set of rules 280 for a current location 275 of the vehicle 100 from an external server or source through a network connection associated with the vehicle 100.

When the customization module 220 receives a set of parameters 270 from a driver through the user interface 250, before allowing the associated vehicle component 260 to be configured to operate according to the parameters 270 of the set of parameters 270, the compliance module 230 may first determine that the parameters 270 comply with the set of rules 280 associated with the current location 275 of the vehicle 100.

Accordingly, when the set of parameters 270 for a vehicle component 260 is received, the compliance module 230 may determine the current location 275 of the vehicle 100. Depending on the embodiment, the compliance module 230 may determine the current location 275 of the vehicle 100, and may retrieve or request the set of rules 280 that govern the current location 275.

After obtaining the set of rules 280 for the current location 275, the compliance module 230 may determine if the set of parameters 270 proposed for the vehicle component 260 comply with each of the rules 280 of the set of rules 280. Any method for determining if a parameter 270 complies with a rule 280 may be used.

If the proposed parameters 270 comply with each of the rules 280 of the set of rules 280, the compliance module 230 may allow the customization module 220 to configure the associated vehicle component 260 to operate according to the parameters 270. If any of the parameters 270 do not comply with one or more of the rules 280, the compliance module 230 may alert the driver by displaying a warning or message in the user interface 250. The message may indicate the particular parameter(s) 270 that do not comply with one or more rules 280 of the set of rules 280. In addition, the message may recommend one more alternative parameters 270 that do comply with the rules 280 of the set of rules 280.

As may be appreciated, as the vehicle 100 travels, or time passes, the set of rules 280 that are applicable to the parameters 270 of a vehicle customization may change. For example, the vehicle 100 may drive to a different state or country, and a different set of rules 280 may not be applicable to the vehicle component 260 customizations. In another example, the set of rules 280 that are in effect at a location may change due to changes or updates to one or more national, state, or local laws governing vehicle components 260.

Accordingly, in some embodiments, when the compliance module 230 determines that the current location 275 associated with the vehicle 100 has changed (e.g., the vehicle 100 has traveled to a new city, state, or country), the compliance module 230 may retrieve the set of rules 280 corresponding to the new location 275 and may verify that each of the vehicle components 260 that have been customized comply with the set of rules 280. Any vehicle components 160 with customizations that no longer comply may be disabled by the compliance module 230 (i.e., returned to default parameters 270), or may have one or more of their associated parameters 270 adjusted to comply. Alternatively or additionally, the compliance module 230 may present the driver with one or more compliant parameters 270 to replace the non-compliant parameters 270. Depending on the embodiment, the compliance module 230 may perform similar steps when it is determined that one or more of the rules 280 have changes due to legislation or action by a governing or controlling body, or periodically (e.g., once a week, once month, or once a year).

Figure 3:
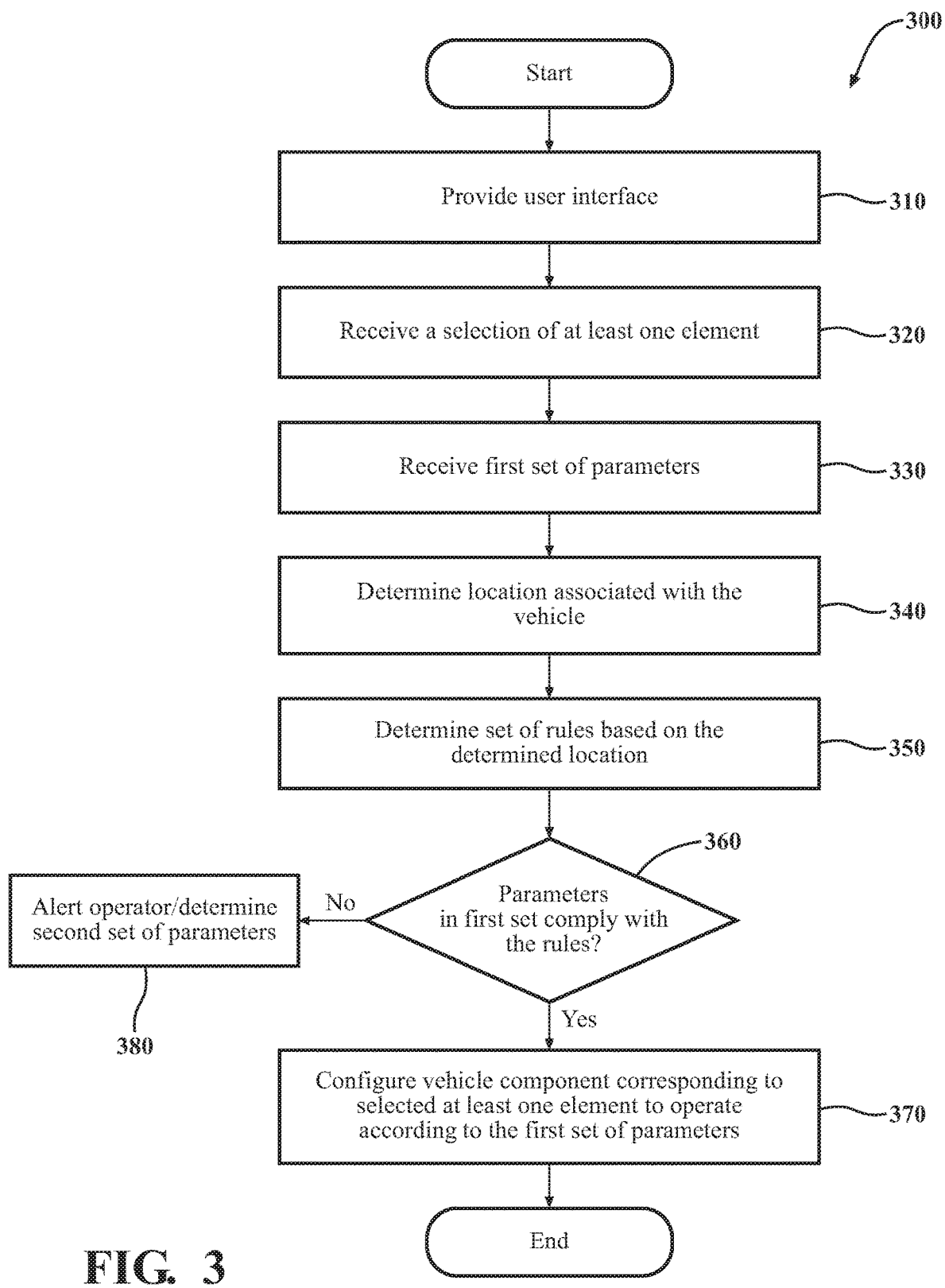
FIG. 3 illustrates a flowchart of a method that is associated with receiving a customization for a vehicle component and for determining if the customization complies with one or more rules.

Additional aspects of customizing vehicle components 260 will be discussed in relation to FIG. 3. FIG. 3 illustrates a flowchart of a method 300 that is associated with receiving a customization for a vehicle component 260 and for determining if the customization complies with one or more rules 280. The method 300 will be discussed from the perspective of the vehicle customization system 170 of FIGS. 1 and 2. While the method 300 is discussed in combination with the vehicle customization system 170, it should be appreciated that the method 300 is not limited to being implemented within the vehicle customization system 170 but is instead one example of a system that may implement the method 300.

At 310, the customization module 220 provides a user interface 250. The customization module 220 may provide the user interface 250 to a driver or operator of a vehicle 100 through an app associated with a smartphone or through a website. Depending on the embodiment, the user interface 250 may be displayed on a display associated with the vehicle 100. The user interface 250 may display a plurality of elements, and each of the elements may correspond to a vehicle component 260 of the vehicle 100. The vehicle components 260 may correspond to the various lights of the vehicle 100 or other components such as windows, mirrors, and windshield wipers, for example.

At 320, the customization module 220 receives a selection of at least one element. Depending on the embodiment, the driver may provide the selection by touching the element in the app displaying the user interface 250, or by clicking on the element using a mouse or other input device. The selected at least one element may correspond to a vehicle component 260.

At 330, the customization module 220 receives a first set of parameters 270. The customization module 220 may receive the first set of parameters 270 from the driver through the user interface 250. Depending on the embodiment, the driver may select the parameters 270 from a drop box or other user interface element that includes some or all of the parameters 270, and parameter values, which are available for the vehicle component 260. For example, if the selected vehicle component 260 was a headlight, the customization module 220 may display parameters 270 that are available for the headlight such as brightness, direction, color, and trigger. The driver may then select values for some or all of the displayed parameters 270.

At 340, the compliance module 230 determines a location 275 associated with the vehicle 100. The compliance module 230 may determine the location of the vehicle 100 using a GPS or other location determination technology made available by the vehicle systems 140. The location of the vehicle 100 may be the current location of the vehicle 100.

At 350, the compliance module 230 determines a set of rules 280 based on the determined location 275. The rules 280 in the set of rules 280 may be laws, regulations, codes, etc. that specify the lawful operation of one or more vehicle components 260. The compliance module 230 may determine the set of rules 280 by determining one or more of the city, state, and country that the vehicle 100 is located in based on the determined location 275. Depending on the embodiment, the compliance module 230 may then retrieve the appropriate set of rules 280 corresponding to the determined city, state, or country from storage (e.g., the database 240 or memory 210), or may request the set of rules 280 from an external source (e.g., the Internet).

At 360, the compliance module 230 determines if the parameters 270 in the first set of parameters 270 comply with the rules 280 of the set of rules 280. Depending on the embodiment, the first set of parameters 270 complies with the first set of rules 280 if none of the parameters 270 in the first set of parameters 270 violates a rule 280 in the set of rules 280. If all of the parameters 270 in the first set of parameters 270 comply with the rules 280 of the set of rules 280, the method 300 may continue at 370. Else, the method 300 may continue at 380.

At 370, the customization module 220 may configure the vehicle component 260 corresponding to the selected element to operate according to the parameters 270 of the first set of parameters 270. Depending on the embodiment, the customization module 220 may configure the vehicle component 260 by sending instructions to the vehicle systems 140.

At 380, the compliance module 230 alerts the operator or driver of the vehicle 100 that one or more parameters 270 of the first set of parameters 270 does not comply with one or more rules 280 of the first set of rules 280. The alert may be displayed to the operator in the user interface 250 or on a display associated with the vehicle 100. The alert may indicate the particular rule or rules 280 that the parameters 270 are not in compliance with.

Alternatively or additionally, the compliance module 230 may modify one or more of the parameters 270 of the first set of parameters 270 to comply with the rules 280 of the set of rules to generate a second set of parameters 270. The customization module 220 may then configure the associated vehicle component 260 to operate according to the parameters 270 of the second set of parameters 270. Depending on the embodiment, the compliance module 230 may display the second set of parameters 270 to the driver along with a description of the particular rules 280 that were violated by the first set of parameters 270.

Figure 4:
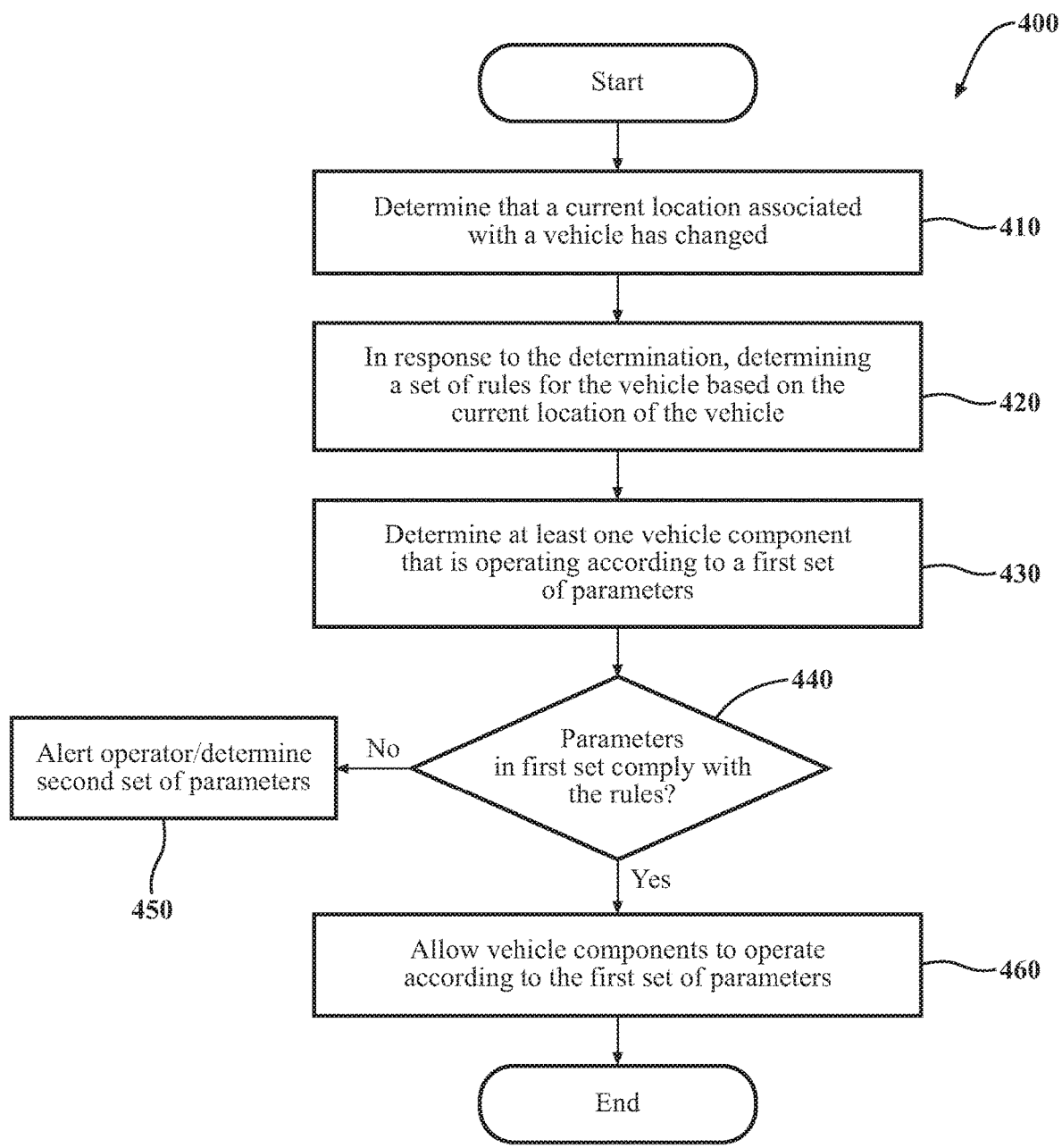
FIG. 4 illustrates a flowchart of a method that is associated with determining that a vehicle location has changed, and for determining if customizations associated with one or more vehicle components comply with one or more rules.

Additional aspects of customizing vehicle components 260 will be discussed in relation to FIG. 4. FIG. 4 illustrates a flowchart of a method 300 that is associated with determining that a location 275 associated with a vehicle has changed, and for determining if any existing vehicle component 260 customizations comply with one or more rules 280 associated with the new location. The method 400 will be discussed from the perspective of the vehicle customization system 170 of FIGS. 1 and 2. While the method 400 is discussed in combination with the vehicle customization system 170, it should be appreciated that the method 400 is not limited to being implemented within the vehicle customization system 170 but is instead one example of a system that may implement the method 400.

At 410, the compliance module 230 determines that a current location associated with a vehicle 100 has changed. The compliance module 230 may determine the location of the vehicle 100 using a GPS or other location determination technology made available by the vehicle systems 140. Depending on the embodiment, the compliance module 230 may determine that the current location has changed when the current location 275 of the vehicle 100 is in a different city, state, or country than a previous current location 275 of the vehicle 100.

At 420, in response to the determination that the current location 275 associated with the vehicle 100 has changed, the compliance module 230 determines a set of rules 280 based on the current location 275. The rules 280 in the set of rules 280 may be laws, regulations, codes, etc. that specify the lawful operation of one or more vehicle components 260. The compliance module 230 may determine the set of rules 280 by determining one or more of the city, state, and country that the vehicle 100 is located in based on the current location 275.

At 430, the compliance module 230 determines at least one vehicle component 260 that is operating according to a first set of parameters 270. The compliance module 230 may determine the at least one vehicle component 260 from information provided by one or both of the vehicle systems 140 and the customization module 220. The at least one vehicle component 260 may have been previously customized by the driver of the vehicle 100 when the driver provided the first set of parameters 270 through the user interface 250.

At 440, the compliance module 230 determines if the parameters 270 in the first set of parameters 270 comply with the rules 280 of the set of rules 280 for the new current location 275. As may be appreciated, the parameters 270 in the first set of parameters 270 may have complied with the rules 280 associated with the previous current location 275, but may not comply with the rules 280 associated with the new current location 275. If all of the parameters 270 in the first set of parameters 270 comply with the rules 280 of the set of rules 280, the method 400 may continue at 460. Else, the method 400 may continue at 450.

At 460, the customization module 220 may allow the at least one vehicle component 260 to operate according to the parameters 270 of the first set of parameters 270.

At 470, the compliance module 230 alerts the operator or driver of the vehicle 100 that one or more parameters 270 of the first set of parameters 270 does not comply with one or more rules 280 of the first set of rules 280 associated with the new current location 275. The alert may be displayed to the operator in the user interface 250 or on a display associated with the vehicle 100. The alert may indicate the particular rule or rules 280 that the parameters 270 are not in compliance with.

Alternatively or additionally, the compliance module 230 may modify one or more of the parameters 270 of the first set of parameters 270 to comply with the rules 280 of the set of rules to generate a second set of parameters 270. The customization module 220 may then configure the associated vehicle component 260 to operate according to the parameters 270 of the second set of parameters 270. Depending on the embodiment, the compliance module 230 may display the second set of parameters 270 to the driver along with a description of the particular rules 280 that were violated by the first set of parameters 270.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vehicle customization system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the vehicle customization system 170, and/or the autonomous driving module(s) 160 may control some or all of these vehicle systems 140 and, thus, may be partially or fully autonomous.

The processor(s) 110, the vehicle customization system 170, and/or the autonomous driving module(s) 160 can be operatively connected to communicate with the various vehicle systems 140 and/or individual components thereof. For example, returning to FIG. 1, the processor(s) 110, the vehicle customization system 170, and/or the autonomous driving module(s) 160 can be in communication to send and/or receive information from the various vehicle systems 140 to control the movement, speed, maneuvering, heading, direction, etc. of the vehicle 100. The processor(s) 110, the vehicle customization system 170, and/or the autonomous driving module(s) 160 may control some or all of these vehicle systems 140.

The processor(s) 110, the vehicle customization system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the vehicle customization system 170, and/or the autonomous driving module(s) 160 can control the direction and/or speed of the vehicle 100. The processor(s) 110, the vehicle customization system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vehicle customization system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

What is claimed is:

1. A vehicle customization system for customizing one or more components of a vehicle comprising:
one or more processors;
a memory communicably coupled to the one or more processors and storing:
a customization module including instructions that when executed by the one or more processors cause the one or more processors to:
provide a user interface, the user interface including a plurality of elements, and each element corresponding to a vehicle component of a plurality of vehicle components;
receive a selection of at least one element of the plurality of elements through the user interface; and
receive a first set of user proposed parameters for operation of the vehicle component corresponding to the selected at least one element, the first set of user proposed parameters including at least one or more function parameters indicative of how the vehicle component will behave and one or more trigger parameters indicative of under what circumstances the vehicle component will behave according to the one or more function parameters; and
a compliance module including instructions that when executed by the one or more processors cause the one or more processors to:
determine a location associated with the vehicle;
determine a set of rules for the vehicle based on the determined location;
determine if the parameters of the first set of user proposed parameters comply with the rules of the set of rules; and
if it is determined that the parameters of the first set of user proposed parameters comply with the rules of the set of rules, configure the vehicle component corresponding to the selected at least one element to operate according to the first set of user proposed parameters.

2. The system of claim 1, wherein the plurality of vehicle components include one or more of taillights, headlights, brake lights, interior lights, turn signals, horn, and windshield wipers.

3. The system of claim 1, wherein the function parameters include one or more of shape, duration, color, pattern, trigger, brightness, and fade.

4. The system of claim 1, wherein determining the location associated with the vehicle comprises determining the location of the vehicle using a GPS.

5. The system of claim 1, wherein determining the set of rules for the vehicle based on the determined location comprise determining a country that the vehicle is located in based on the determined location, and determining the set of rules for the vehicle for the determined country.

6. The system of claim 1, wherein determining the set of rules for the vehicle based on the determined location comprise determining a state that the vehicle is located in based on the determined location, and determining the set of rules for the vehicle for the determined state.

7. The system of claim 1, wherein the compliance module further includes instructions that when executed by the one or more processors cause the one or more processors to:
if it is determined that the parameters of the first set of user proposed parameters do not comply with the rules of the set of rules, configure the vehicle component corresponding to the selected at least one element to operate according to a second set of parameters, wherein the second set of parameters are based on the first set of user proposed parameters and comply with the rules of the set of rules.

8. A method for customizing one or more components of a vehicle comprising:
determining that a current location associated with a vehicle has changed;
in response to the determination that the current location associated with the vehicle has changed, determining a set of rules for the vehicle based on the current location of the vehicle;
determining at least one vehicle component of a plurality of vehicle components of the vehicle that is operating according to a first set of user proposed parameters, the first set of user proposed parameters including at least one or more function parameters indicative of how the vehicle component will behave and one or more trigger parameters indicative of under what circumstances the vehicle component will behave according to the one or more function parameters;
determining if the first set of user proposed parameters comply with the determined set of rules; and
if it is determined that the first set of user proposed parameters comply with the determined set of rules, allowing the at least one vehicle component to operate according to the first set of user proposed parameters.

9. The method of claim 8, further comprising:
if it is determined that the first set of user proposed parameters do not comply with the determined set of rules, alerting an operator of the vehicle to change one or more parameters of the first set of user proposed parameters.

10. The method of claim 8, further comprising:
if it is determined that the parameters of the first set of user proposed parameters do not comply with the rules of the set of rules, configuring the at least one component to operate according to a second set of parameters, wherein the second set of parameters comply with the rules of the set of rules and are based on the first set of user proposed parameters.

11. The method of claim 8, wherein the plurality of vehicle components include one or more of taillights, headlights, brake lights, interior lights, turn signals, horn, and windshield wipers.

12. The method of claim 8, wherein the function parameters include one or more of shape, duration, color, pattern, trigger, brightness, and fade.

13. The method of claim 8, wherein determining that the current location associated with the vehicle has changed comprises determining that the current location associated with the vehicle has changed using a GPS.

14. The method of claim 8, wherein determining that a current location associated with the vehicle has changed comprises determining that a current state where the vehicle is located has changed.

15. The method of claim 8, wherein determining that a current location associated with the vehicle has changed comprises determining that a current country where the vehicle is located has changed.

16. A non-transitory computer-readable medium for customizing one or more components of a vehicle and including instructions that when executed by one or more processors cause the one or more processors to:
provide a user interface, the user interface including a plurality of elements, and each element corresponding to a vehicle component of a plurality of vehicle components;
receive a selection of at least one element of the plurality of elements through the user interface;
receive a first set of user proposed parameters for operation of the vehicle component corresponding to the selected at least one element, the first set of user proposed parameters including at least one or more function parameters indicative of how the vehicle component will behave and one or more trigger parameters indicative of under what circumstances the vehicle component will behave according to the one or more function parameters;
determine a location associated with the vehicle;
determine a set of rules for the vehicle based on the determined location;
determine if the parameters of the first set of user proposed parameters comply with the rules of the set of rules; and
if it is determined that the parameters of the first set of user proposed parameters comply with the rules of the set of rules, configure the vehicle component corresponding to the selected at least one element to operate according to the first set of user proposed parameters.

17. The non-transitory computer-readable medium of claim 16, wherein the plurality of vehicle components include one or more of taillights, headlights, brake lights, interior lights, turn signals, horn, and windshield wipers.

18. The non-transitory computer-readable medium of claim 16, wherein the function parameters include one or more of shape, duration, color, pattern, brightness, and fade.

19. The non-transitory computer-readable medium of claim 16, wherein determining the set of rules for the vehicle based on the determined location comprise determining a country that the vehicle is located in based on the determined location, and determining the set of rules for the vehicle for the determined country.

20. The non-transitory computer-readable medium of claim 16, wherein determining the set of rules for the vehicle based on the determined location comprise determining a state that the vehicle is located in based on the determined location, and determining the set of rules for the vehicle for the determined state.

\* \* \* \* \*